(12) United States Patent
Robertson et al.

(10) Patent No.: US 10,106,264 B1
(45) Date of Patent: Oct. 23, 2018

(54) ROCKET-BASED INVERTED PARACHUTE DEPLOYMENT SYSTEM

(71) Applicant: Kitty Hawk Corporation, Mountain View, CA (US)

(72) Inventors: Cameron Robertson, San Mateo, CA (US); Todd Reichert, Mountain View, CA (US); Damon Vander Lind, Oakland, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 164 days.

(21) Appl. No.: 15/249,079

(22) Filed: Aug. 26, 2016

(51) Int. Cl.
*B64D 17/00* (2006.01)
*B64D 17/62* (2006.01)
*F42B 10/02* (2006.01)
*B64D 17/80* (2006.01)

(52) U.S. Cl.
CPC ............. *B64D 17/62* (2013.01); *B64D 17/80* (2013.01); *F42B 10/02* (2013.01)

(58) Field of Classification Search
CPC ...... B64D 17/62; B64D 17/72; B64D 17/725; B64D 17/80
See application file for complete search history.

(56) References Cited

U.S. PATENT DOCUMENTS

| 2,924,409 | A | * | 2/1960 | Burke, Jr. | B64D 17/54 244/149 |
|---|---|---|---|---|---|
| 5,409,187 | A | * | 4/1995 | Dunham | B63C 9/26 102/340 |
| 6,682,017 | B1 | * | 1/2004 | Giannakopoulos | B64D 17/80 244/138 R |
| 2016/0280380 | A1 | * | 9/2016 | Fourie | B64D 1/12 |
| 2018/0050805 | A1 | * | 2/2018 | Kalinka | B64D 17/72 |
| 2018/0111695 | A1 | * | 4/2018 | Homan | B64D 17/72 |

* cited by examiner

*Primary Examiner* — Richard G Davis
(74) *Attorney, Agent, or Firm* — Van Pelt, Yi & James LLP

(57) ABSTRACT

A system to deploy a parachute is disclosed. In various embodiments, a plurality of rockets are attached to a perimeter of the parachute. Each of the rockets is configured to fly initially in a first direction substantially in a direction of deployment of the parachute and to fly subsequently along a trajectory that includes a component that is substantially perpendicular to the direction of deployment and extends radially from a center of the parachute.

19 Claims, 9 Drawing Sheets

ROCKET-BASED INVERTED PARACHUTE DEPLOYMENT SYSTEM

BACKGROUND OF THE INVENTION

The time between when an emergency occurs and when an aircraft is fully caught by a parachute is critical. The parachute may not fully inflate immediately or quickly. The parachute may not slow the aircraft enough to prevent the aircraft from being damaged upon landing.

BRIEF DESCRIPTION OF THE DRAWINGS

Various embodiments of the invention are disclosed in the following detailed description and the accompanying drawings.

DETAILED DESCRIPTION

Figure 1A:
FIG. 1A is a diagram illustrating an embodiment of a rocket-based inverted parachute deployment system prior to deployment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A rocket-based inverted parachute deployment system is disclosed. The rocket-based inverted parachute deployment system comprises a plurality of rockets tethered to a perimeter of the parachute. Each of the rockets is configured to fly initially in a first direction substantially in a direction of deployment of the parachute and to fly subsequently along a trajectory that includes a component that is substantially perpendicular to the direction of deployment and extends radially from a center of the parachute. In some embodiments, the trajectory includes a second component substantially opposite the direction of deployment.

The rockets may be configured to be propelled in such a way that an initial upwards force is applied to the perimeter of the parachute and a subsequent outwards and/or downwards force is applied to the perimeter of the parachute, causing the parachute to be deployed. The parachute may be initially deployed in an inverted position due to the rockets being shot upwards. The rockets may then travel downwards and away from a center of the parachute, bringing the perimeter of the parachute's canopy down. The rockets' trajectory may be optimized in order to effectively deploy the parachute. For example, the rockets may be designed to burn out of fuel at a certain time, causing gravity to pull the rockets downwards. The rockets may actively change their trajectory. Passive, non-electric solutions may be employed in controlling the rocket trajectories. In some embodiments, the rocket-based inverted parachute deployment system deploys the parachute more rapidly than a conventional parachute deployment system. The rockets may extract the parachute quickly and then fill the parachute quickly by pulling it down. The system may be capable of recovering an aircraft experiencing dangerous low altitude or low speed conditions.

FIG. 1A is a diagram illustrating an embodiment of a rocket-based inverted parachute deployment system prior to deployment. In the example shown, canisters 100 and 104 are attached to parachute container 102. Canisters 100 and 104 may each store a rocket. Parachute container 102 may store a parachute. The parachute may be folded or compressed in parachute container 102.

Figure 1B:
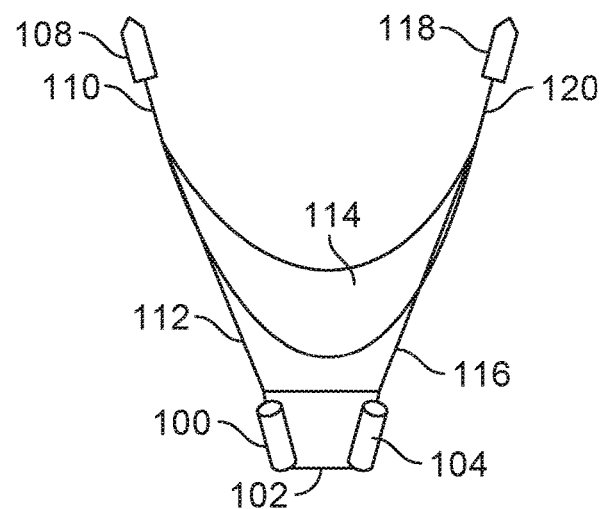
FIG. 1B is a diagram illustrating an embodiment of a rocket-based inverted parachute deployment system during deployment.

FIG. 1B is a diagram illustrating an embodiment of a rocket-based inverted parachute deployment system during deployment. In the example shown, rocket 108 is deployed from canister 100 and rocket 118 is deployed from canister 104. In some embodiments, the rockets are deployed vertically from their canisters. In some embodiments, the rockets are deployed upwards and at an angle away from a center of the parachute. Rocket 108 and rocket 118 are tethered to parachute 114 via tethers 110 and 120 respectively. Parachute 114 is tethered to parachute container 102 via tethers 112 and 116. In some embodiments, the parachute is extracted in stages and FIG. 1B illustrates an embodiment of a first extraction stage.

In the example shown, parachute 114 is inverted. Rockets 108 and 118 are attached at points around the perimeter of parachute 114. The center of parachute 114 is at a lower altitude than corners of the parachute that are tethered to rockets 108 and 118.

In some embodiments, rockets 108 and 118 are ignited via a mechanical solution. For example, a rocket may have a blasting cap that ignites propellant in the rocket when hit with a spring loaded pin. The rocket may have an electronic igniter wherein high voltage through a wire creates heat that ignites the rocket. In some embodiments, rocket igniters are reliable and fast, allowing the parachute to be extracted with a measure of precision. In some embodiments, a rocket used in the system carries its propellant with it.

Figure 1C:
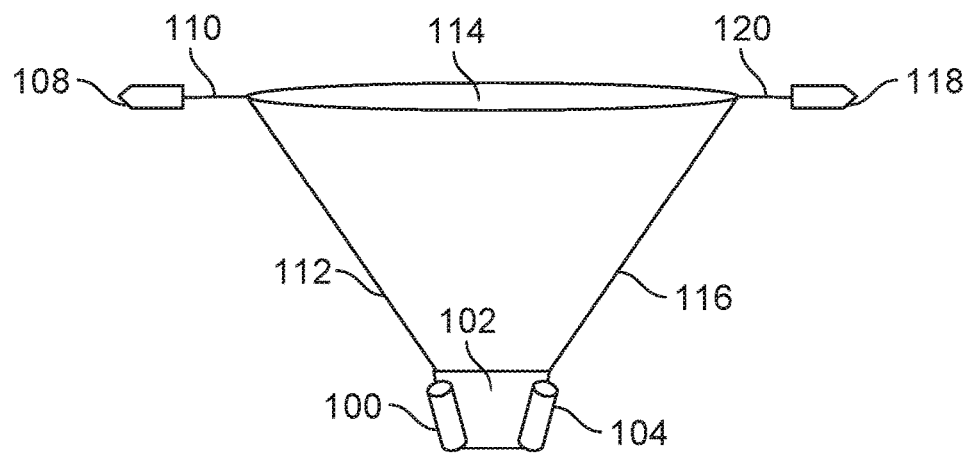
FIG. 1C is a diagram illustrating an embodiment of a rocket-based inverted parachute deployment system during deployment.

FIG. 1C is a diagram illustrating an embodiment of a rocket-based inverted parachute deployment system during deployment. In the example shown, rockets 108 and 118 are both pulling parachute 114 in a horizontal direction, pulling away from the parachute's center. Parachute 114 is no longer inverted but pulled taut. Rockets 108 and 118 pull parachute 114 out and open via tethers 110 and 120. Parachute 114 is attached to parachute container 102 via tethers 112 and 116. Empty canisters 100 and 104 are attached to parachute container 102.

In some embodiments, the rockets transition from the position shown in FIG. 1B to the position shown in FIG. 1C when they reach the end of their tethers. The rockets pull nearly straight out as the parachute begins to fill and take over as the source of tension on tethers 112 and 116. At the point when tethers 110 and 120 are taut, the rockets may begin to change direction. Drag from the parachute may impact the rockets' trajectory.

Figure 1D:
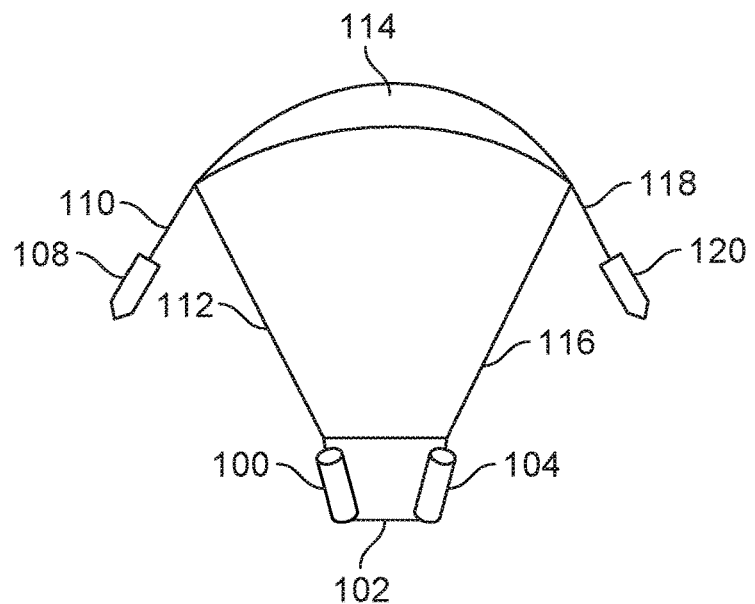
FIG. 1D is a diagram illustrating an embodiment of a rocket-based inverted parachute deployment system during deployment.

FIG. 1D is a diagram illustrating an embodiment of a rocket-based inverted parachute deployment system during deployment. In the example shown, rockets 108 and 120 are directed downwards. Parachute 114 has corners of its perimeter pulled down via rockets 108 and 120. Parachute 114 has captured air and its center is at a higher altitude than its edges. However, the parachute is not completely filled with air. In some embodiments, rockets transition from the position shown in FIG. 1C to the position shown in FIG. 1D when they are expended of fuel. Gravity may cause the rockets to turn from a sideways position perpendicular to the direction of deployment to a downwards position opposite the direction of deployment.

Figure 1E:
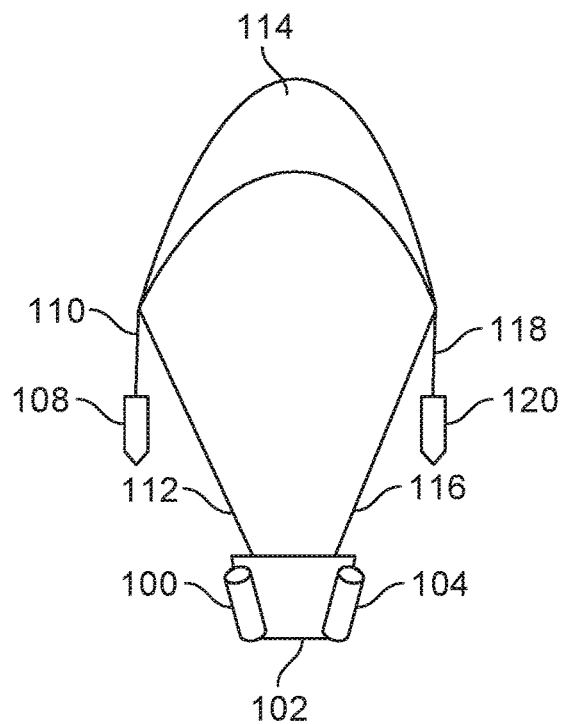
FIG. 1E is a diagram illustrating an embodiment of a rocket-based inverted parachute deployment system after deployment.

FIG. 1E is a diagram illustrating an embodiment of a rocket-based inverted parachute deployment system after deployment. In some embodiments, parachute 114 has reached its final deployment stage and is fully expanded. Rockets 108 and 120 as shown dangle from parachute 114 via tethers 110 and 118. In some embodiments, the rockets detach when the parachute is filled or fully extracted. In some embodiments, the rockets have expended their fuel and are lightweight. Parachute 114 carries the full load of canisters 100 and 104 and parachute container 102 via tethers 112 and 116.

Figure 2:
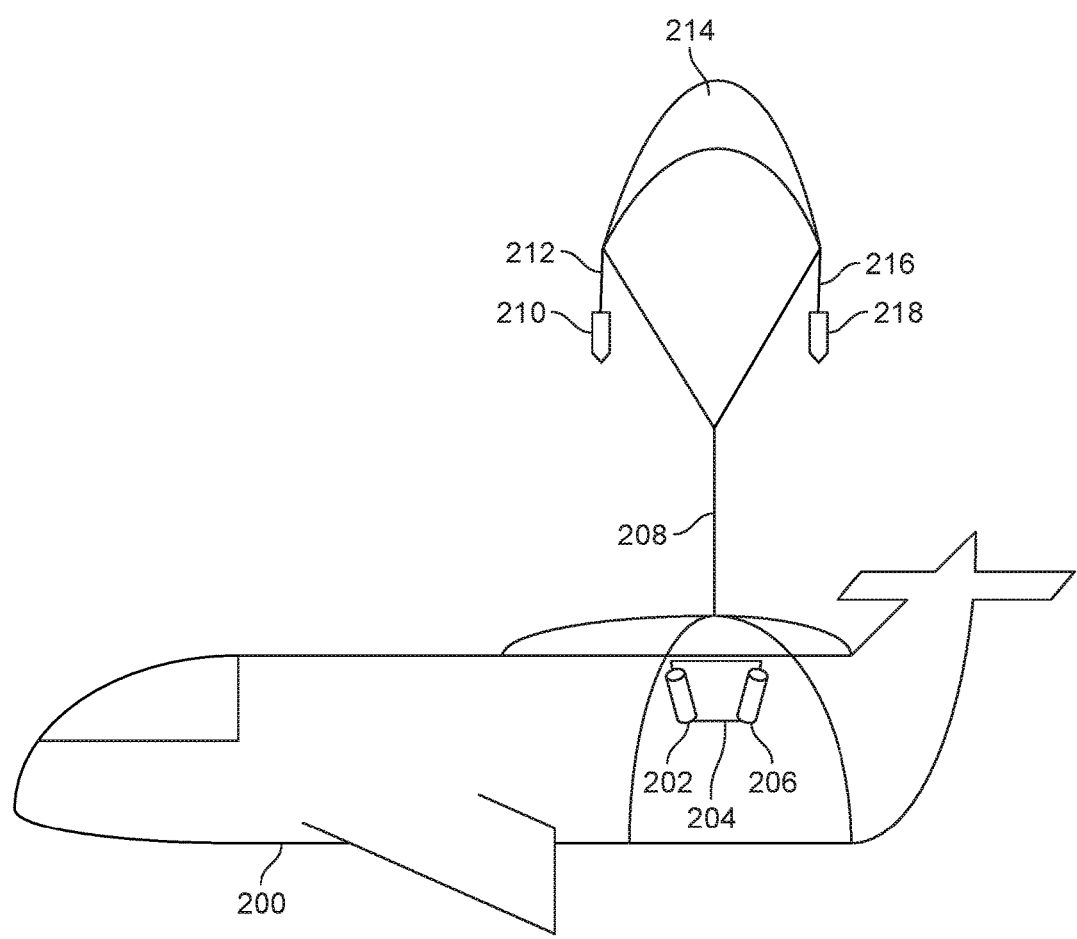
FIG. 2 is a diagram illustrating an embodiment of a rocket-based inverted parachute deployment system on an aircraft.

FIG. 2 is a diagram illustrating an embodiment of a rocket-based inverted parachute deployment system on an aircraft. In some embodiments, the system is used to recover an aircraft. The system may be used to recover the aircraft in dangerous low altitude and low speed conditions, wherein standard systems typically fail to extract or fill the parachute in time to save the parachute. In the example shown, parachute 214 is fully extracted. Rockets 210 and 218 hang to parachute 214 via tethers 212 and 216. Parachute 214 is tethered to a bridle of aircraft 200 via tether 208. The bridle may be attached aircraft 200 towards the back end of the aircraft in order to land the aircraft in a nose first position. In the example shown, canister 202, canister 206, and parachute container 204 are situated in the aircraft. They may be stored in an enclosed section of the aircraft. Rockets 210 and 218 may break through a surface of the aircraft upon initial deployment. In some embodiments, the canisters and container are attached to the outside of the aircraft.

The placement of the rockets or bridle may vary based on the structure or design of the aircraft. In some embodiments, rockets are stored towards the back of an aircraft while bridle lines are stored near the front of an aircraft. Bridle lines may be placed near a cockpit or designated pilot seating area in order to best protect a human passenger of the aircraft. In some embodiments bridle lines are stowed in channels below the surface of the aircraft and are ripped out, tearing an outer skin of the aircraft, when the parachute is deployed. Bridle or rocket placement may be determined based on an aircraft weight, an aircraft structural attachment point, aircraft power system or propeller placement, or any other appropriate factor.

Figure 3:
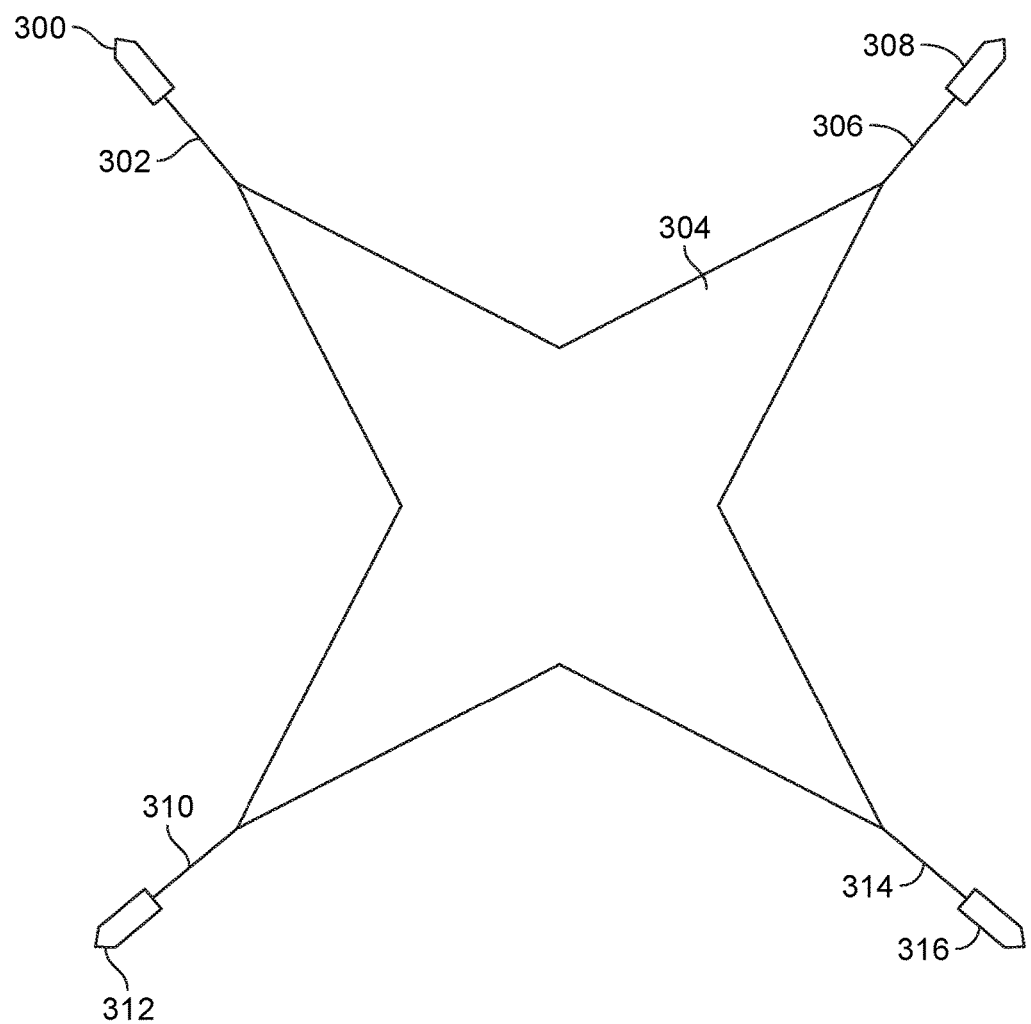
FIG. 3 is a diagram illustrating a top view of an embodiment of a rocket-based inverted parachute deployment system during deployment.

FIG. 3 is a diagram illustrating a top view of an embodiment of a rocket-based inverted parachute deployment system during deployment. In some embodiments, the diagram illustrates a first stage of deployment wherein the parachute is in an inverted position. The diagram shown may be a top view of parachute 304 as it is extracted via rockets 300, 308, 312, and 316. Rockets 300, 308, 312, and 316 are tethered to parachute 304 via tethers 302, 306, 314, and 310 respectively. The parachute may be deployed in an inverted star shape due to the corners of the parachute being pulled upwards.

In various embodiments, two, five, ten, or any appropriate number of rockets are used. In some embodiments, the number of rockets is determined based on how quickly the parachute is desired to be deployed, how quickly the rockets can be deployed, or weight considerations (e.g. a weight of a rocket motor). For example, a powerful and heavy rocket may be quick to deploy but due to weight considerations the number of rockets that may be used is limited. In some embodiments, a large number of rockets is used to deploy the parachute uniformly around its perimeter. A large number of rockets may be used for redundancy purposes or to mitigate the impact of a malfunctioning rocket. In some embodiments, the rockets are tested or designed for reliability to minimize chances of a rocket deploying off-schedule or in the wrong direction.

Figure 4:
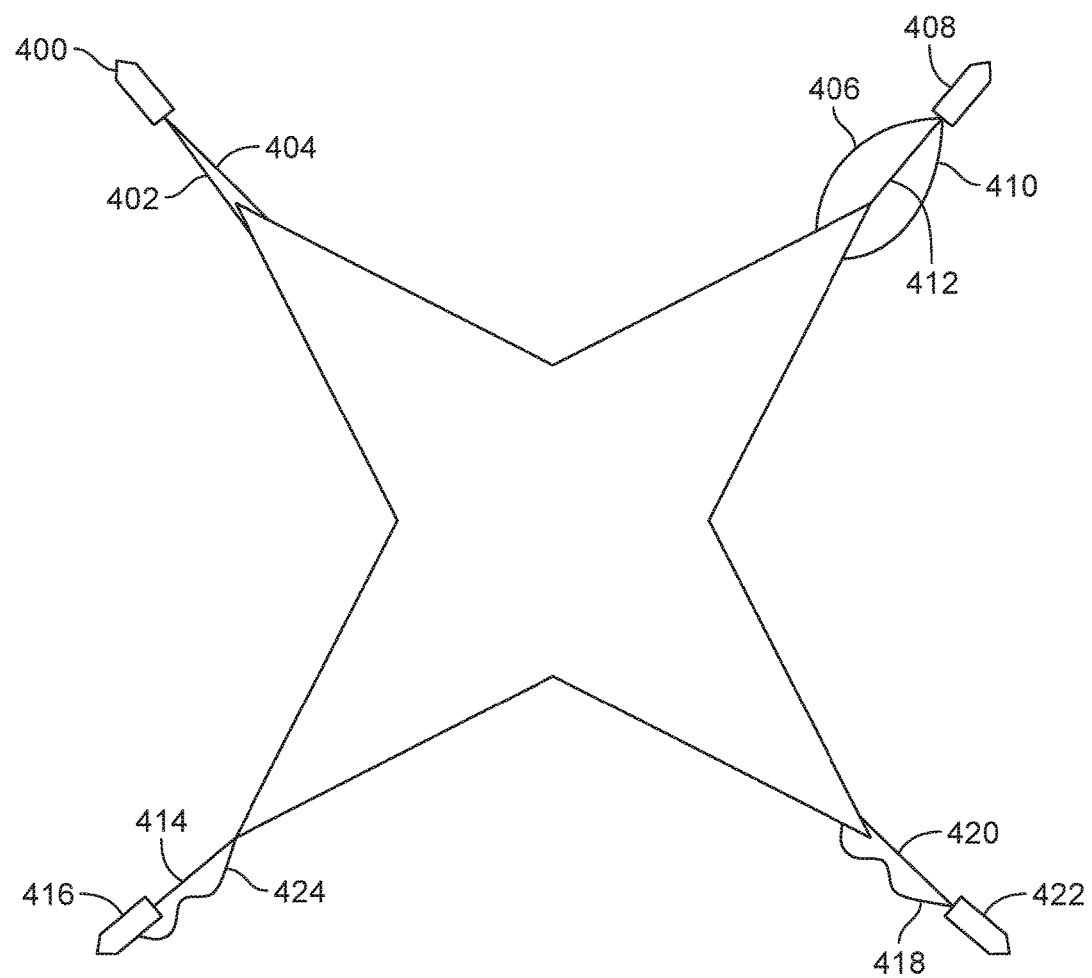
FIG. 4 is a diagram illustrating a top view of an embodiment of a rocket-based inverted parachute deployment system during deployment.

FIG. 4 is a diagram illustrating a top view of an embodiment of a rocket-based inverted parachute deployment system during deployment. In some embodiments, a rocket has multiple tethers attaching it to the parachute. In some embodiments, the tether attaching the rocket to the parachute includes rings, hooks, or any other attachment equipment. Aerodynamic stabilizers may be designed into the rocket. The rocket may have multiple lines attached to the parachute in order to orient the rocket correctly. For example, rocket 400 is attached to parachute 422 with tethers 402 and 404. Tethers 402 and 404 may help keep rocket 400 centered at a point between the two tethers. The tethers may be designed to guide the rocket into falling outwards after they run out of fuel, rather than falling inwards on top of the inverted parachute.

In some embodiments, parachute 304 is folded or packed such that it is extracted in a star-shaped pattern. A portion of the parachute attached to a rocket may be initially extruded in a narrow, pointed, or triangular shape. The parachute may include stitching or straps that hold the portion of the parachute in the narrow or pointed shape. The stitching or straps may break away as the rocket flies away from the center of the parachute, releasing more of the parachute. A component holding a corner of the parachute together in a narrow shape may slowly unwind as the parachute is deployed, gradually releasing fabric. The parachute may shift from a star shape to a circular shape.

In some embodiments, tethers are used to actively shape a rocket's trajectory. In some embodiments, a rocket of the plurality of rockets is tethered to the parachute with multiple tethers comprising a tether than pulls the rocket downward. For example, one line may be connected to a rocket as it fires and with another slack line connected to a nose of the rocket. When the rocket is at an optimal height or point in deployment the line connected to the nose may become taut and redirect the rocket sideways and/or downwards. In some embodiments, the rocket is fully thrusting throughout redirection. The rocket may pull the perimeter of the parachute down faster than it would if it was falling due to gravity, causing the parachute to be filled quickly.

Rocket 416 is attached to parachute 422 via tether 414 and tether 424. In the example shown, tether 424 is attached at the side of rocket 416. Tether 424 may be attached closer to a tail of the rocket than the rocket's center of gravity. Tether 424 may pull the rocket from an upwards direction to a direction away from the center of the parachute.

Rocket 408 is attached to parachute 422 via three tethers. Tethers 406, 410, and 412 are used. In some embodiments, all rockets attached to a same parachute are attached in the same method. In some embodiments, rockets attached to a same parachute are attached with varying numbers of tethers or the tethers are attached to the rockets in varying places. The rockets may be attached differently to account for irregularities in the parachute or differences between rockets (e.g. differences in power, size, or amount of fuel).

Figure 5:
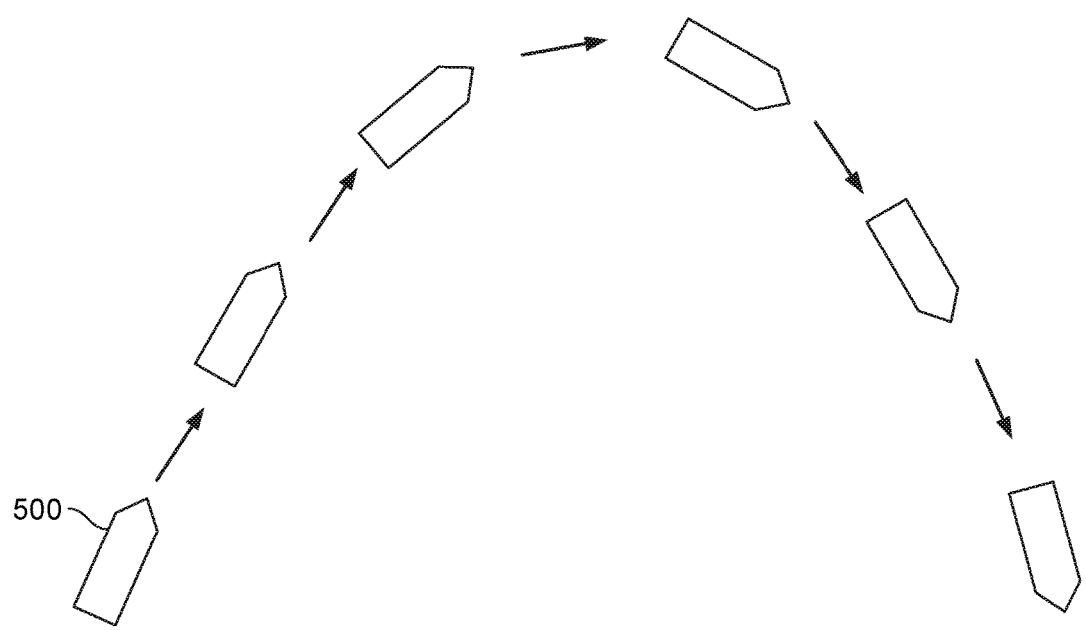
FIG. 5 is a diagram illustrating an embodiment of a trajectory of a rocket of a rocket-based inverted parachute deployment system.

FIG. 5 is a diagram illustrating an embodiment of a trajectory of a rocket of a rocket-based inverted parachute deployment system. In the figure shown, rocket 500 travels in a parabolic trajectory. In some embodiments, rockets of a rocket-based inverted parachute deployment system fly in a parabolic trajectory. They may fly outwards, in a direction away from a center of the parachute. The parabolic flight of the rockets may first spread the parachute open in an inverted position and then flip the perimeter of the parachute down, causing it to be filled quickly. In some embodiments, the rockets do not fly in a parabolic trajectory but rather a trajectory that is determined to be optimal for the parachute and/or aircraft. In some embodiments, simulation or testing is executed to determine the optimal progression of a parachute's deployment for a specific aircraft. Deployment of the parachute can be shaped or accelerated by controlling the trajectories of the rockets used.

In some embodiments, specifications of the rockets such as a rocket size or amount of propellant are designed based on a desired time of flight and trajectory. The characteristics of a designated aircraft in freefall may impact the design of the parachute deployment system. A system designed for a large, light weight aircraft may employ rockets that deploy more slowly than rockets of a system designed for a small and heavy aircraft that does not have much drag. The geometry of flight of the rockets may be more complex than ballistic objects. The rockets' trajectories may impacted by the way the rockets are bridled to the parachute. The trajectories may be impacted by the shape of the rocket nozzles.

Figure 6:
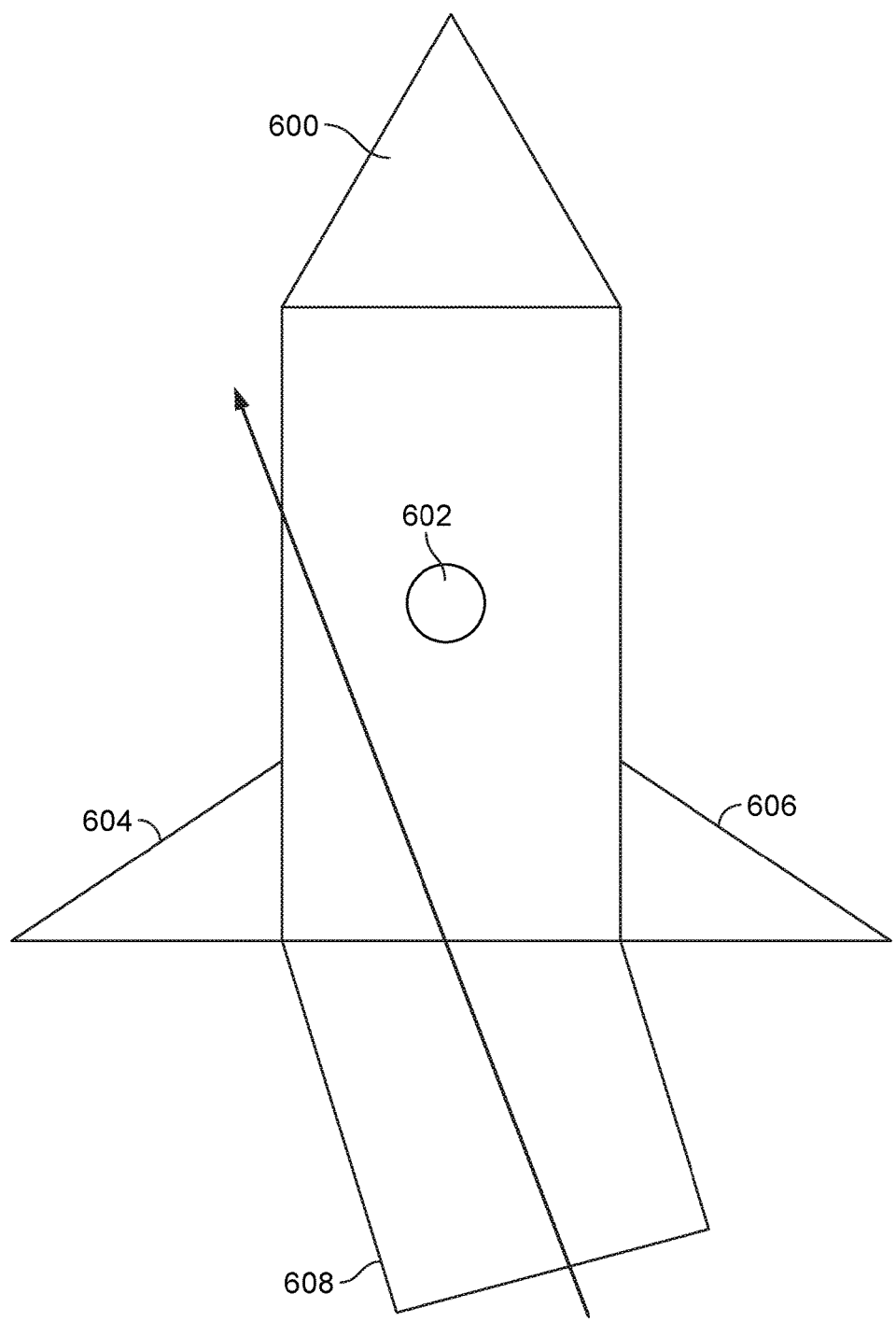
FIG. 6 is a diagram illustrating an embodiment of a rocket of a rocket-based inverted parachute deployment system.

FIG. 6 is a diagram illustrating an embodiment of a rocket of a rocket-based inverted parachute deployment system. In the example shown, rocket nozzle 608 is designed to have a slight moment. Nozzle 608 is vectored in a direction away from rocket center of gravity 602 as shown by the arrow. The shape of the nozzle causes the rocket to turn away from the center of the aircraft. In the example shown, the nozzle causes the rocket to turn towards the right and the left side of the rocket is intended to be facing the center of the parachute. The rocket as shown includes fins 604 and 606 and nose 600. The rocket may initially fly straight in the direction it is deployed and then curve or turn. The degree to which nozzle 608 is angled may affect how fast the rocket turns or changes direction.

Figure 7A:
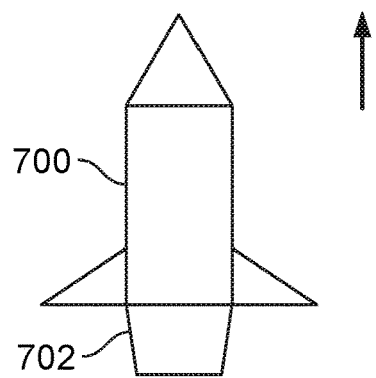
FIG. 7A is a diagram illustrating an embodiment of a rocket of a rocket-based inverted parachute deployment system.
Figure 7B:
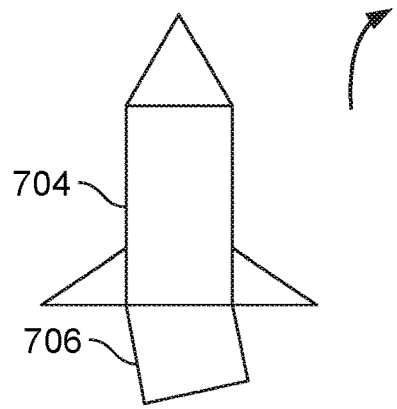
FIG. 7B is a diagram illustrating an embodiment of a rocket of a rocket-based inverted parachute deployment system.
Figure 7C:
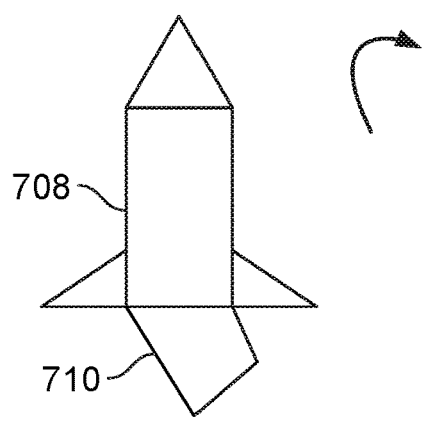
FIG. 7C is a diagram illustrating an embodiment of a rocket of a rocket-based inverted parachute deployment system.

FIG. 7A is a diagram illustrating an embodiment of a rocket of a rocket-based inverted parachute deployment system. FIGS. 7A, 7B, and 7C show a rocket that has a nozzle that changes shape throughout deployment. In some embodiments, the nozzle is made of a material that changes shape when it is exposed to heat. The material may be a shape-memory alloy that returns to an original shape when exposed to heat, or be bimetallic. In some embodiments, the nozzle becomes progressively angled away from the rest of the rocket after the rocket is deployed. The nozzle may have a final state at which point additional heat does not cause further changes in shape. A rocket's fuel may be kept primarily in the nozzle. As the rocket burns through its fuel, the nozzle may increase in temperature, causing the nozzle to change in shape until it reaches a predetermined state. In some embodiments, the rate at which a rocket burns through its fuel can be predicted. A rocket may be designed to initially burn fast in order to reach an initial elevation and then taper off into a consistent, lower heat burn.

In FIG. 7A, rocket 700 is deployed upwards at a vertical angle. Nozzle 702 is in line with the body of rocket 700. FIG. 7A may show a rocket in an initial stage of deployment directly after being shot out from a canister.

FIG. 7B is a diagram illustrating an embodiment of a rocket of a rocket-based inverted parachute deployment system. In the example shown, nozzle 702 is angled left of rocket 700's center of gravity. Nozzle 702 may be responding to an increased temperature due to fuel being burned within a combustion chamber of the rocket. Rocket 700 is turned slightly towards the right.

FIG. 7C is a diagram illustrating an embodiment of a rocket of a rocket-based inverted parachute deployment system. In the example shown, the temperature of nozzle 702 may have increased since FIG. 7B, causing the nozzle to further angle away from the body of rocket 700. Rocket 700 is increasingly directed towards the right. In some embodiments, the direction the rocket is turned is away from the center of the parachute.

In some embodiments, the nozzle is not made of a material that changes with heat but is instead mounted on a material that changes with heat. A nozzle mount may be made with more heat-sensitive material on one side than the other, causing the nozzle to be angled away from the rocket. The nozzle may be partially or entirely composed of heat-sensitive material. The nozzle may direct the rocket's thrust.

The rocket may have a portion of its casing that is more sensitive to heat in comparison to the majority of its casing, causing the portion to burn away as the rocket's propellant burns. As the rocket burns, a slot may be burned away from a side of the rocket, causing the rocket's flame to burst from the slot. Burning away a portion of the rocket casing may cause the rocket to rotate away from a center of the parachute or change its trajectory.

In some embodiments, a fin of a rocket of the plurality of rockets is shaped to cause the rocket to turn after it is deployed. The fin or fins may change in shape after the rocket is deployed. The fins may be made of a bimetallic material or heat sensitive material. In some embodiments, the fins of a rocket are attached to the rocket's nozzle. A rocket nozzle may contain the rocket's combustion chamber, causing the nozzle to be the area of the rocket that experiences the most heat as the rocket's fuel burns. A fin or a nozzle of a rocket of the system may change in shape after the rocket is deployed based on an intensity or duration of heat released from the nozzle.

In some embodiments, a fin or a nozzle of a rocket of the plurality of rockets is controlled by a pilot, a computer, or a servomotor after deployment of the rocket. For example, a small computer or computing chip may be attached to the nose of the rocket, away from the heat of the nozzle. The computer may control the trajectory of the rocket. Servomotors may be used to control the nozzle or the fins of the rocket, shaping the rocket's trajectory. The pilot, computer, or servomotor may cause the rocket to fly in a direction substantially perpendicular to a direction of initial deployment. The pilot, computer, or servomotor may subsequently cause the rocket to fly in a direction substantially opposite the direction of initial deployment.

Figure 8A:
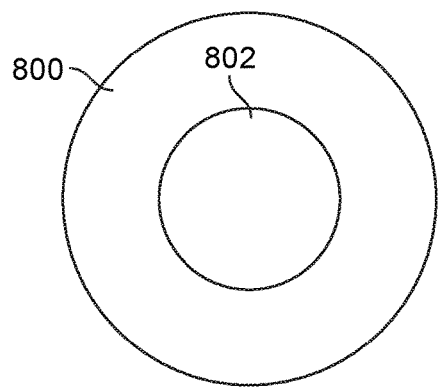
FIG. 8A is a diagram illustrating an embodiment of a cross section of a rocket of a rocket-based inverted parachute deployment system.

FIG. 8A is a diagram illustrating an embodiment of a cross section of a rocket of a rocket-based inverted parachute deployment system. Inside rocket 800 is cylindrical combustion chamber 802. Combustion chamber 802 is where the rocket's fuel is burned. In some embodiments, a combustion chamber type of a rocket of the plurality of rockets is determined based on a trajectory of the rocket determined to optimally deploy the parachute. The combustion chamber may be shaped to cause the fuel to burn faster or slower.

Figure 8B:
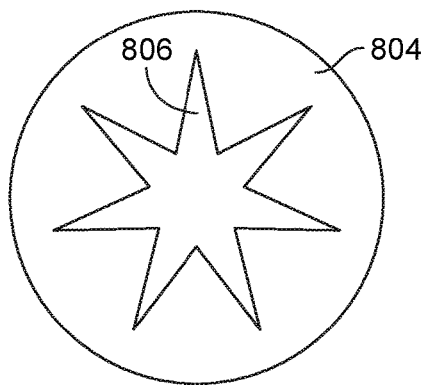
FIG. 8B is a diagram illustrating an embodiment of a cross section of a rocket of a rocket-based inverted parachute deployment system.

FIG. 8B is a diagram illustrating an embodiment of a cross section of a rocket of a rocket-based inverted parachute deployment system. Fuel may burn faster in a combustion chamber that has a large surface area. In the example shown, rocket 804 includes combustion chamber 806. Combustion chamber 806 has a star-shaped cross section that has an increased amount of surface area in comparison to combustion chamber 802 of FIG. 8A. All other factors equal, rocket 804 may expend its fuel in a shorter amount of time than rocket 800 of FIG. 8A. Combustion chamber 806 may be used in deployment of a small, durable parachute that is desired to be deployed quickly. Burning fuel faster may cause a rocket to fall downwards soon after deployment, pulling the parachute's perimeter down. Propellant geometry may be optimized for an initial fast burn that tapers off or becomes consistent. Combustion chamber 802 may cause an initial fast burn due to its large surface area. When the propellant has burned past the jagged star-shaped area, the combustion chamber may have a resultant circular shape. The resultant circular shape may cause the rocket to burn propellant more slowly.

In some embodiments, the shape of the combustion chamber may cause the rocket to turn midflight. For example, the combustion chamber may be radially asymmetric. An asymmetric combustion chamber may cause the rocket's center of thrust to progressively change as the propellant burns.

Figure 9:
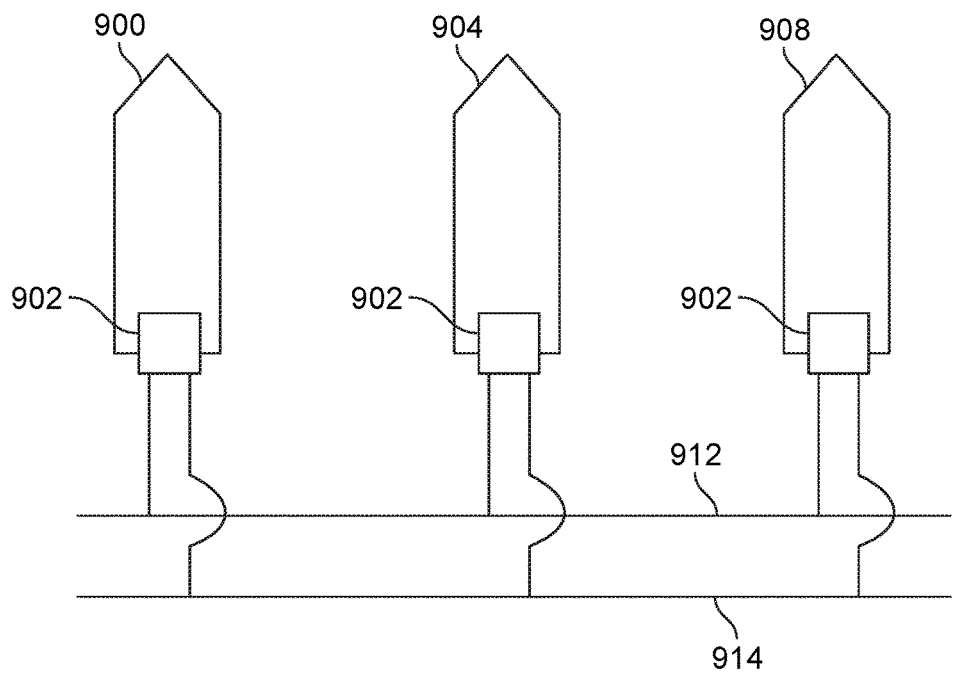
FIG. 9 is a diagram illustrating an embodiment of a wiring of rockets of a rocket-based inverted parachute deployment system.

FIG. 9 is a diagram illustrating an embodiment of a wiring of rockets of a rocket-based inverted parachute deployment system. In the example shown, rocket 900 includes igniter 902. Rocket 904 includes igniter 906 and rocket 908 includes igniter 910. Igniters 902, 906, and 910 are attached to power line 912 and ground line 914. In some embodiments, the rockets are ignited at the same time via power line 912.

In some embodiments, a circuit sets off the rockets in stages. For example, rockets that are positioned near the tail end of an aircraft may be deployed first, followed by rockets that positioned over the middle of the aircraft, and followed by rockets positioned over the front of an aircraft. The rockets may be deployed in stages in order to load the parachute slowly, decreasing a risk of the parachute tearing. In some embodiments, the number of stages rockets are deployed in is dependent on aircraft environmental conditions. For example, the rockets may be deployed in stages when the aircraft is at a high altitude. The rockets may be deployed simultaneously when the aircraft is at a low altitude and requires that the parachute be extracted more quickly. The plurality of rockets may be deployed at once or in stages based on a pilot indication, an environmental condition, or an aircraft condition. In some embodiments, a pilot is in control of the number of deployment stages of the rockets. In some embodiments, the flight computer automatically determines the number of deployment stages of the rockets based on sensor information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to deploy a parachute, comprising:
   a plurality of rockets attached to a perimeter of the parachute,
   wherein each of the rockets is configured to fly initially in a first direction substantially in a direction of deployment of the parachute and to fly subsequently along a trajectory that includes a component that is substantially perpendicular to the direction of deployment and extends radially from a center of the parachute.

2. The system of claim 1, wherein the trajectory includes a second component substantially opposite the direction of deployment.

3. The system of claim 1, wherein the plurality of rockets initially deploy the parachute in an inverted position.

4. The system of claim 1, wherein a rocket of the plurality of rockets flies in a parabolic trajectory away from a center of the parachute.

5. The system of claim 1, wherein a rocket of the plurality of rockets is tethered to the parachute with multiple tethers comprising a tether than pulls the rocket in a direction substantially opposite the direction of deployment.

6. The system of claim 1, wherein a nozzle of a rocket of the plurality of rockets is shaped to cause the rocket to turn after it is deployed.

7. The system of claim 1, wherein a nozzle of a rocket of the plurality of rockets is angled away from the rest of the rocket.

8. The system of claim 1, wherein a nozzle of a rocket of the plurality of rockets changes in shape after the rocket is deployed.

9. The system of claim 1, wherein a nozzle of a rocket of the plurality of rockets becomes progressively angled away from the rest of the rocket after the rocket is deployed.

10. The system of claim 1, wherein a fin of a rocket of the plurality of rockets is shaped to cause the rocket to turn after it is deployed.

11. The system of claim 1, wherein a fin of a rocket of the plurality of rockets changes in shape after the rocket is deployed.

12. The system of claim 1, wherein a nozzle or a fin of a rocket of the plurality of rockets comprises a bimetallic material or a material that changes shape under heat.

13. The system of claim 1, wherein a fin of a rocket of the plurality of rockets is attached to a nozzle of the rocket.

14. The system of claim 1, wherein a fin or a nozzle of a rocket of the plurality of rockets changes in shape after the rocket is deployed based on an intensity or duration of heat released from the nozzle.

15. The system of claim 1, wherein a nozzle of a rocket of the plurality of rockets is controlled by a pilot, a computer, or a servomotor after deployment of the rocket.

16. The system of claim 1, wherein a size, a number, a fuel type, or a fuel amount of the plurality of rockets is determined based on a trajectory of the rocket determined to optimally deploy the parachute.

17. The system of claim 1, wherein a combustion chamber type of a rocket of the plurality of rockets is determined based on a trajectory of the rocket determined to optimally deploy the parachute.

18. The system of claim 1, wherein the plurality of rockets are able to be deployed at once or in stages.

19. The system of claim 1, wherein the plurality of rockets are able to be deployed at once or in stages based on a pilot indication, an environmental condition, or an aircraft condition.

* * * * *